United States Patent
Lackey

(10) Patent No.: US 12,245,560 B2
(45) Date of Patent: Mar. 11, 2025

(54) PLANTER INSERT FOR ELEVATING PLANT WITHIN A PLANTER

(71) Applicant: Michael Lackey, Kennesaw, GA (US)

(72) Inventor: Michael Lackey, Kennesaw, GA (US)

( * ) Notice: Subject to any disclaimer, the term of this patent is extended or adjusted under 35 U.S.C. 154(b) by 222 days.

(21) Appl. No.: 18/076,698

(22) Filed: Dec. 7, 2022

(65) Prior Publication Data

US 2023/0180672 A1 Jun. 15, 2023

Related U.S. Application Data

(60) Provisional application No. 63/286,858, filed on Dec. 7, 2021.

(51) Int. Cl.
*A01G 9/02* (2018.01)
*A47G 33/12* (2006.01)

(52) U.S. Cl.
CPC .................................. *A01G 9/028* (2013.01)

(58) Field of Classification Search
CPC ............ E04H 12/2269; E04H 12/2238; A47G 33/1206; A47G 2033/1233; A47G 33/12; A01G 17/14; A01G 27/02; A01G 2009/003; A01G 9/028
See application file for complete search history.

(56) References Cited

U.S. PATENT DOCUMENTS

| | | | | |
|---|---|---|---|---|
| 626,514 A | * | 6/1899 | Wagner | A47G 33/12 248/527 |
| 1,805,095 A | * | 5/1931 | Horni | E01F 9/688 40/607.1 |
| 1,874,119 A | * | 8/1932 | Propst | A47G 33/1206 248/526 |
| 1,931,376 A | * | 10/1933 | Cosner | A47G 33/12 248/527 |
| 2,190,544 A | * | 2/1940 | Jarnagin | A47G 33/12 428/141 |
| 2,531,690 A | * | 11/1950 | Kennel | A47G 33/12 248/527 |
| 2,543,896 A | * | 3/1951 | Daiiy | A47G 33/12 248/527 |

(Continued)

FOREIGN PATENT DOCUMENTS

| | | |
|---|---|---|
| KR | 101301014 B1 | 9/2013 |
| KR | 200469479 Y1 | 10/2013 |

(Continued)

OTHER PUBLICATIONS https://www.homedepot.com/p/Bloem-Ups-A-Daisy-Round-17-in-Plastic-Planter-Lift-Insert-T6327/204151245?source=shoppingads&locale-en-US&pla&mtc=Shopping-VF-F_D29A-G-D29A-Multi-Multi-NA-Feed-PLA_LIA-2153902-WFMinorAppl_Minor_Appliances_Special_Buys&cm_mmc-Shopping-VF-F_D29A-GD29A-Multi-Multi-NA-Feed-PLA_LIA-2153902-WFMinorAppl_Minor_Appliances_Special_Buys-71700000042813121-58700004539894749-92700067474701002&gclid=CjwKCAiAp8iMBhAqEiwAJb94z3zMMt2OMdUB3pzIyoR3VeEqxoGap09ouw7fppMzgTyEiURGhgPhhoCzIsQAvD_BwE&gclsrc=aw.ds Printed/Accessed Nov. 15, 2021.

*Primary Examiner* — Monica L Perry

(74) *Attorney, Agent, or Firm* — Meunier Carlin & Curfman LLC

(57) ABSTRACT

Various implementations include a planter insert. The planter insert includes a base having a wall and a floor, two or more legs, and a cover. The wall and floor define a cavity which is impermeable to liquid. The two or more legs each have a first end and a second end opposite and spaced apart from the first end. The first end of each of the two or more legs is coupled to the base. The second end of at least one of the two or more legs is movable between a first and a second position. The second end is closer to the base in the first position than it is in the second position. The cover is coupled to the base.

20 Claims, 14 Drawing Sheets

(56) References Cited

U.S. PATENT DOCUMENTS

| | | | | |
|---|---|---|---|---|
| 2,750,138 A * | 6/1956 | Morris | F16M 11/22 | 248/524 |
| 2,905,414 A * | 9/1959 | Zierden | A47G 33/12 | 248/527 |
| 2,913,202 A * | 11/1959 | Meldrum | A47G 33/12 | 47/40.5 |
| 3,038,688 A * | 6/1962 | Thorburn | A47G 33/12 | 248/524 |
| 3,231,226 A * | 1/1966 | Rossler | A47G 33/12 | 248/524 |
| 3,250,504 A * | 5/1966 | Schwaderlapp | A47G 33/12 | 248/527 |
| 3,298,642 A * | 1/1967 | Taylor | A47G 33/1226 | 248/524 |
| 3,329,380 A * | 7/1967 | Graves | A47G 33/12 | 248/527 |
| 3,350,043 A * | 10/1967 | Apple | A47G 33/12 | 248/188.5 |
| 3,405,895 A * | 10/1968 | Perkins | A47G 33/12 | 108/150 |
| 3,784,136 A * | 1/1974 | Lopez | A47G 33/12 | 47/40.5 |
| 3,954,129 A * | 5/1976 | Rudell | A47G 33/045 | 47/40.5 |
| 4,006,560 A * | 2/1977 | Schulz | A47G 33/12 | 47/40.5 |
| 4,034,505 A * | 7/1977 | Lydall | A47G 33/12 | 248/527 |
| 4,148,455 A * | 4/1979 | Oliver | E04H 12/2246 | 248/524 |
| 4,261,138 A * | 4/1981 | St. George Syms | A47G 33/12 | 47/40.5 |
| 4,596,262 A * | 6/1986 | Tegze | E04H 12/2246 | 135/21 |
| 4,825,586 A * | 5/1989 | Coppedge | A47G 33/12 | 248/529 |
| 4,884,363 A * | 12/1989 | Sofy | A47G 33/12 | 248/527 |
| 4,977,703 A | 12/1990 | Blanc | | |
| 5,000,414 A * | 3/1991 | Rosato | A47G 33/12 | 248/524 |
| 5,048,230 A * | 9/1991 | Bernardy | A47G 33/12 | 47/40.5 |
| 5,332,196 A * | 7/1994 | Wright | E04H 17/006 | 256/DIG. 5 |
| 5,398,444 A * | 3/1995 | Murray | A47G 33/1226 | 248/515 |
| 5,782,453 A * | 7/1998 | Tuzza | A47G 33/12 | 248/519 |
| 5,893,547 A * | 4/1999 | Cohen, Jr. | A47G 33/126 | 248/521 |
| 5,987,813 A * | 11/1999 | Lasko | A47G 33/12 | 47/40.5 |
| 6,010,108 A * | 1/2000 | Welzen | A47G 33/045 | 248/527 |
| 6,023,882 A * | 2/2000 | Heinrich | A47G 33/04 | D11/130.1 |
| 6,129,325 A * | 10/2000 | Niklas | A47G 33/12 | 248/524 |
| 6,299,124 B1 * | 10/2001 | Reback | F16M 11/046 | 248/527 |
| 6,901,700 B2 | 6/2005 | Trabka | | |
| 7,600,342 B2 * | 10/2009 | Fiveash | A47G 33/12 | 47/40.5 |
| 8,091,853 B2 * | 1/2012 | Clores | A47G 33/12 | 248/523 |
| 8,146,291 B2 * | 4/2012 | Noblett | A47G 33/12 | 47/42 |
| 8,251,337 B2 * | 8/2012 | Jordan | A47G 33/12 | 248/528 |
| 8,782,950 B2 | 7/2014 | Miel et al. | | |
| 9,462,758 B2 | 10/2016 | Blaha | | |
| 10,238,227 B1 * | 3/2019 | Burke | A47G 33/12 | |
| 10,407,936 B2 * | 9/2019 | Foltz | E04H 12/2269 | |
| 10,745,931 B1 * | 8/2020 | Gathers | E04H 12/2269 | |
| 11,692,368 B2 * | 7/2023 | Currie | A47G 7/07 | 47/41.11 |
| 2004/0129184 A1 * | 7/2004 | Kraker | E04H 12/2223 | 108/50.12 |
| 2005/0005518 A1 * | 1/2005 | Iseki | A01G 9/028 | 47/79 |
| 2009/0119983 A1 * | 5/2009 | Jones | A47G 33/12 | 47/40.5 |
| 2009/0199467 A1 * | 8/2009 | Reed | A47G 33/12 | 47/40.5 |
| 2012/0235012 A1 * | 9/2012 | Andrassy | A47G 33/12 | 248/523 |
| 2013/0042528 A1 | 2/2013 | Nason | | |
| 2014/0151526 A1 * | 6/2014 | Duncan | A47G 33/12 | 248/523 |
| 2014/0291472 A1 * | 10/2014 | Leung | A47G 33/1206 | 248/524 |
| 2016/0037951 A1 * | 2/2016 | Meves | A47G 33/12 | 47/40.5 |

FOREIGN PATENT DOCUMENTS

| | | |
|---|---|---|
| KR | 200486547 Y1 | 6/2018 |
| WO | 2013187630 A1 | 12/2013 |
| WO | 2019090431 A1 | 5/2019 |

* cited by examiner

PLANTER INSERT FOR ELEVATING PLANT WITHIN A PLANTER

BACKGROUND

Planters used for containing plants are often sized larger than the one or more plants that are disposed within them. When a large planter contains one or more plants, the planter may be much deeper than needed for the plant roots to grow, and the soil below the roots of these plants may only be needed for elevating the plants in the planter.

Fillers are sometimes used to plant or elevate plants in a planter when removed from grow pots. Example fillers include soil, rocks, packing peanuts, vermiculite, etc. However, this process still requires removing the plant from its grow pot and planting it in the soil within the planter, which can be messy and a hassle.

Fillers can also be used with plants that are not removed from grow pots. The fillers can be placed in the planter, and the plants in their grow pot can be inserted directly onto the filler in the planter. Examples of materials that are currently being used include florist Styrofoam blocks, bricks, phonebooks, chicken wire, foam blocks, acrylic shelves, etc.

Similarly, planter inserts can be inserted in a planter to elevate the plants in the planter such that the entire planter does not need to be filled with soil or other filler materials. Existing planter inserts include openings for excess water to drain away from the plants into the bottom of the planter. However, similar to using fillers, the standing water that can accumulate in the bottom of the planter can enable bug, bacterial, and/or fungal growth in the planter, which can be harmful or troublesome for people or the plants.

Thus, a need exists for a planter insert that elevates plants within a planter and prevents excess water from draining into the bottom of the planter.

SUMMARY

Various implementations include a planter insert. The planter insert includes a base having a wall and a floor, two or more legs, and a cover. The wall and floor define a cavity which is impermeable to liquid. The two or more legs each have a first end and a second end opposite and spaced apart from the first end. The first end of each of the two or more legs is coupled to the base. The second end of at least one of the two or more legs is movable between a first and a second position. The second end is closer to the base in the first position than it is in the second position. The cover is coupled to the base.

In some implementations, the wall has a first end and a second end opposite and spaced apart from first end of the wall. The floor is coupled to the second end of the wall. The floor includes a protrusion extending toward the first end of the of the wall.

In some implementations, the legs are removably coupled to the base. In some implementations, the base defines openings for receiving on of the two or more legs. The second end of each leg is disposable in a different one of the openings defined by the base. The second end of each leg is removably couplable to a nut such that the leg is retained within the opening.

In some implementations, the second end of the at least one leg moves in an axial direction away from the base when moving from the first position to the second position. In some implementations, the entire at least one leg moves relative to the base.

In some implementations, each of the two or more legs includes a threaded portion. The base defines openings for receiving one of the two or more legs. The second end of each leg is disposable in a different one of the openings defined by the base. Each of the two or more legs include a threaded nut configured to engage the threaded portion of the leg and abut the wall of the base.

In some implementations, the leg includes at least one threaded knob for threadingly engaging one of the threaded portions of the two or more legs for moving the second end between the first position and the second position. In some implementations, the cover defines two or more knob openings, each knob opening being alignable with a different one of the knobs.

In some implementations, each of the two or more legs include a first leg portion having the first end and a second leg portion, having the second end. The first leg portion is couplable to the second leg portion such that the first leg portion is axially aligned with the second leg portion. In some implementations, the first leg portion is couplable to the second leg portion by a coupler. In some implementations, the first leg portion includes a threaded portion and the second leg portion includes a threaded portion. The coupler includes threads couplable to the threaded portion of the first leg portion and the threaded portion of the second leg portion.

In some implementations, the second end of the legs include feet. In some implementations, the feet are flexible. In some implementations, the feet include a textured surface.

In some implementations, the wall has a first end and a second end opposite and space apart from the first end of the wall. The floor is coupled to the second end of the wall. The cover is coupled to the first end of the wall.

In some implementations, the cover is removably coupled to the base. In some implementations, the base includes buttons for removably coupling the cover to the base. In some implementations, the cover extends from the base to the second ends of each of the legs. In some implementations, the cover includes flexible material. In some implementations, the flexible material includes a stretch knit fabric. In some implementations, the cover defines one or more secondary cavities.

In some implementations, the base includes a polymer. In some implementations, the base includes acrylonitrile butadiene styrene (ABS).

In some implementations, the wall of the base has a circular cross-sectional shape as viewed in a plane parallel to the floor. In some implementations, the wall of the base has a rectangular cross-sectional shape as viewed in a plane parallel to the floor.

In some implementations, the cavity is sized to receive a nursery pot.

In some implementations, the wall and the floor defining the cavity are a single piece.

Various other implementations include a planter insert according to another implementation. The planter insert includes a base and a flange extending from the base. The base includes a main portion having an outer surface and an inner surface spaced apart from the outer surface. The main portion defines one or more cavities sized to receive a potted plant. Each of the one or more cavities includes a wall and a floor. The floor is spaced apart from the outer surface and the inner surface such that the floor is closer to the inner surface than the outer surface. The wall of each of the one or more cavities extends between the inner surface of the main portion and the floor. The one or more cavities are impermeable to liquid.

In some implementations, the base further includes an adjustable collar from which the flange extends. The adjustable collar is selectively adjustable to move at least a portion of the flange in an outward direction from a perimetrical edge of the main portion.

In some implementations, the flange extends from a perimetrical edge of the main portion of the base. In some implementations, the flange includes a flexible rolled edge. In some implementations, the main portion and the one or more cavities are a single piece.

In some implementations, the base comprises a polymer. In some implementations, the base comprises acrylonitrile butadiene styrene (ABS).

In some implementations, the planter insert further includes a handle coupled to one of the base or the flange. In some implementations, the outer surface of the main portion includes a convex surface. In some implementations, the outer surface of the main portion includes a concave surface.

In some implementations, the wall of at least one of the one or more cavities has a circular cross-sectional shape as viewed in a plane parallel to the floor of the at least one of the one or more cavities. In some implementations, the wall of at least one of the one or more cavities has a rectangular cross-sectional shape as viewed in a plane parallel to the floor of the at least one of the one or more cavities.

In some implementations, the one or more cavities comprises two or more cavities. In some implementations, the one or more cavities are sized to receive a nursery pot.

Various other implementations include a planter system according to another implementation. The planter system includes a planter and a planter insert. The planter has a floor and a wall extending from the floor. The wall of the planter has an inner surface. The planter insert includes a base and a flange extending from the base. The base has a main portion having an outer surface and an inner surface spaced apart from the outer surface. The main portion defines one or more cavities sized to receive a potted plant. Each of the one or more cavities includes a wall and a floor. The floor is spaced apart from the outer surface and the inner surface such that the floor is closer to the inner surface than the outer surface. The wall of each of the one or more cavities extends between the inner surface of the main portion and the floor. The one or more cavities are impermeable to liquid. A portion of the flange of the planter insert is removably engageable with a portion of the inner surface of the wall of the planter such that the floor of each of the one or more cavities is spaced apart from the floor of the planter.

In some implementations, a shape of the portion of the flange that is removably engageable with the portion of the inner surface of the wall of the planter corresponds to a shape of the portion of the inner surface of the wall of the planter. In some implementations, the shape of the portion of the inner surface of the wall of the planter is circular. In some implementations, the shape of the portion of the inner surface of the wall of the planter is rectangular.

In some implementations, the base further includes an adjustable collar from which the flange extends. The adjustable collar is selectively adjustable to move at least a portion of the flange in an outward direction from a perimetrical edge of the main portion. In some implementations, the flange extends from a perimetrical edge of the main portion of the base. In some implementations, the flange includes a flexible rolled edge. In some implementations, the main portion and the one or more cavities are a single piece.

In some implementations, the base comprises a polymer. In some implementations, the base comprises acrylonitrile butadiene styrene (ABS).

In some implementations, planter system further includes a handle coupled to one of the base or the flange.

In some implementations, the outer surface of the main portion includes a convex surface. In some implementations, the outer surface of the main portion includes a concave surface.

In some implementations, the wall of at least one of the one or more cavities has a circular cross-sectional shape as viewed in a plane parallel to the floor of the at least one of the one or more cavities. In some implementations, the wall of at least one of the one or more cavities has a rectangular cross-sectional shape as viewed in a plane parallel to the floor of the at least one of the one or more cavities.

In some implementations, the one or more cavities comprises two or more cavities. In some implementations, the one or more cavities are sized to receive a nursery pot.

BRIEF DESCRIPTION OF DRAWINGS

Example features and implementations are disclosed in the accompanying drawings. However, the present disclosure is not limited to the precise arrangements and instrumentalities shown.

DETAILED DESCRIPTION

Figure 1:
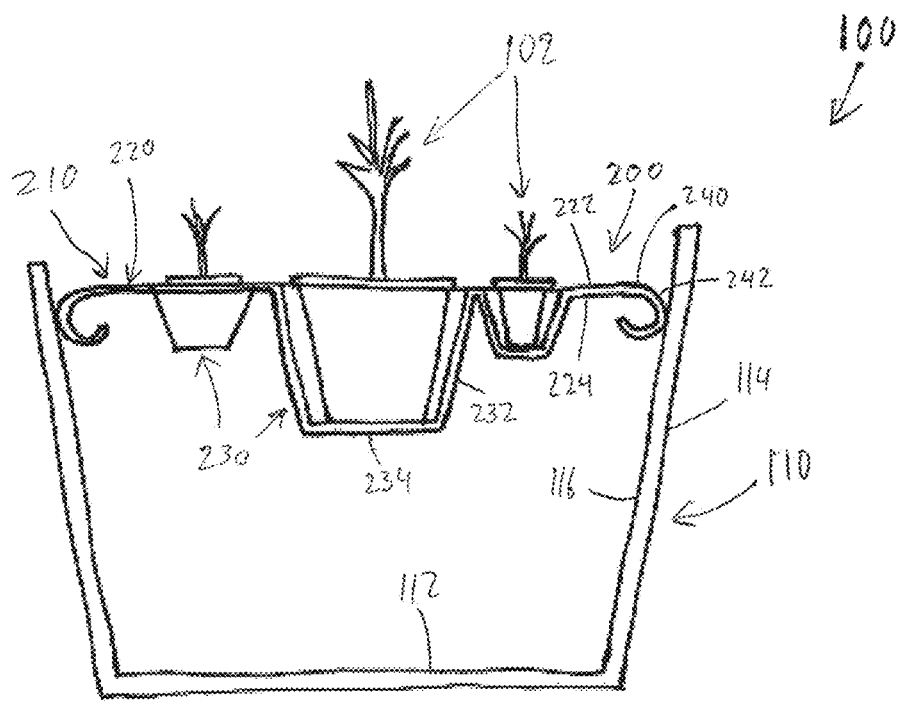
FIG. 1 is a cross-sectional view of a planter system including a planter and a planter insert, according to one implementation.

Some implementations of devices, systems, and methods disclosed herein provide for planter inserts for holding one or more plants in nursery pots within a planter. Each planter insert includes a base having a wall and a floor, the wall and the floor defining a cavity. The planter insert can be disposed within a planter such that two or more legs of the planter insert removably engages with the inner surface of the walls of the planter. A cover is coupled to the base, covering the space between the base and the planter wall. The friction between the leg, cover, and planter wall secures the planter insert above the floor of the plater such that one or more plants disposed in the respective cavities of the planter insert are elevated within the planter.

Other implementations of devices, systems, and methods disclosed herein provide for planter inserts for holding one or more plants in nursery pots within a planter. Each planter insert includes a main portion defining one or more cavities for holding plants and a flange. The planter insert can be disposed within a planter such that the flange of the planter insert removably engages the inner surface of the walls of the planter. The friction between the flange and the planter walls secures the planter insert above the floor of the planter such that the one or more plants disposed in the respective cavities of the planter insert are elevated within the planter. Because the plants are elevated, the plants can protrude from the top opening of the planter without the bottom portion of the planter needing to be filled with soil or other filler materials or objects.

The outer surface of the main portion of the planter insert spans between the walls of the planter such that moss, rocks, or other ground cover can be placed on the outer surface of the main portion to cover the planter insert.

The planter inserts disclosed herein eliminate the need to remove one or more plants from their grow pot and plant them in soil, eliminating the mess and hassle of direct planting. These planter inserts also provide a clean easy way to elevate plants without the need for other materials. The planter inserts further aid in replacing plants within a planter by removing the need to dig up and replant the plant in soil, which can disturb other plants or root structure. The plants can be easily removed to water and treat insects on a specific plant in another location without disturbing other plants within the planter.

The walls and floor of the cavities of the planter insert form a liquid impermeable chamber such that excess water cannot flow into the bottom of the planter. When the plants are placed into the cavities in their nursery pots, any excess water applied to the plants flows from the openings defined in the nursery pots and collects in the floors of the cavities. A user can remove the nursery pots from the planter insert cavities, remove the planter insert from the planter, pour off the excess water from the cavities of the planter insert, reinsert the planter insert within the planter, and replace the nursery pots within their respective cavities. Because the excess water is collected in the cavities instead of draining into the planter, the user does not need to lift or tip over a large planter to pour off excess water.

Various implementations include a planter insert. The planter insert includes a base, two or more legs, and a cover. The base has a wall and a floor, the wall and the floor defining a cavity. The two or more legs have a first end and a second end opposite and spaced apart from the first end. The first end of each of the two or more legs is coupled to the base. The second end of at least one of the two or more legs is movable between a first position and a second position. The second end is closer to the base in the first position than it is in the second position. The cover is coupled to the base. In some implementations, the cavity is impermeable to liquid.

Various other implementations include a planter insert. The planter insert includes a base and a flange. The base has a main portion having an outer surface and an inner surface spaced apart from the outer surface. The main portion defines one or more cavities sized to receive a potted plant (e.g., a plant disposed within soil in a nursery pot). Each of the one or more cavities includes a wall and a floor. The floor is spaced apart from the outer surface and the inner surface such that the floor is closer to the inner surface than the outer surface. The wall of each of the one or more cavities extends between the inner surface of the main portion and the floor. The flange extends from the base. The one or more cavities are impermeable to liquid. In some implementations, the entire base is impermeable to liquid.

Various other implementations include a planter system. The planter system includes a planter and a planter insert, such as the planter insert described above. The planter has a floor and a wall extending from the floor. The wall of the planter has an inner surface. A portion of the flange of the planter insert is removably engageable with a portion of the inner surface of the wall of the planter such that the floor of each of the one or more cavities of the planter insert is spaced apart from the floor of the planter.

FIG. 1 shows a planter system 100 according to one implementation. The planter system 100 includes a planter insert 200 disposed within a planter 110. The planter 110 has a floor 112 and a wall 114. The wall 114 extends from the floor 112 and has an inner surface 116.

Figure 2:
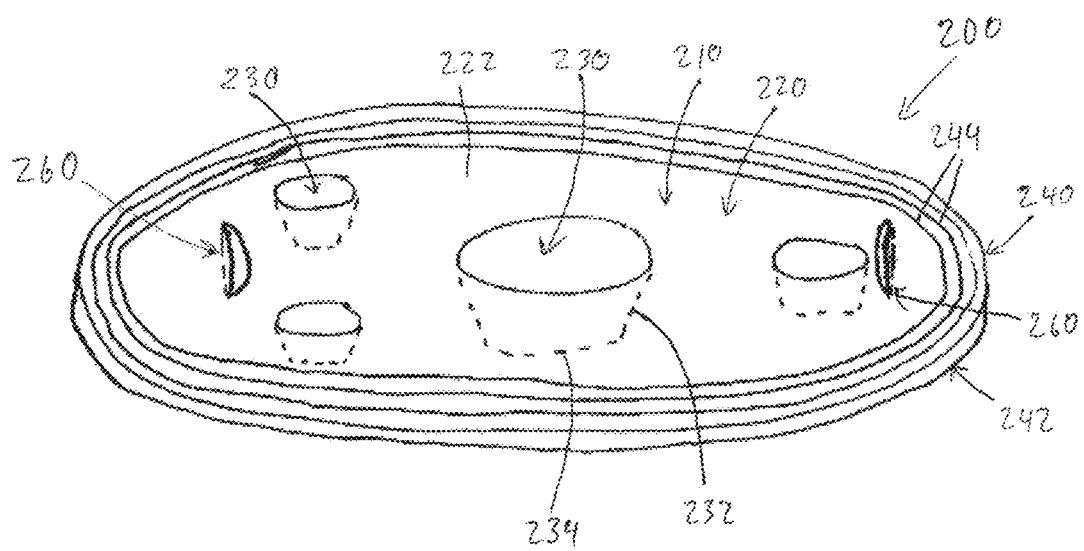
FIG. 2 is a perspective view of the planter insert of FIG. 1.

The planter insert 200 of FIG. 1 is shown alone in FIG. 2. The planter insert 200 includes a base 210 and a flange 240. The base 210 shown in FIG. 2 includes a main portion 220 defining cavities 230. The main portion 220 extends at least partially between the inner surface 116 of the wall 114 of the planter 110 to support the plants 102 that are disposed within the planter insert 200. The main portion 220 can also be used to support any moss, rocks, or other "ground cover" to cover the planter insert 200 when disposed within a planter 110.

The main portion 220 of the base 210 has an outer surface 222 and an inner surface 224 spaced apart from the outer surface 222. The outer surface 222 of the main portion 220 shown in FIG. 2 includes a flat surface, but in other implementations, the outer surface may have other suitable shapes for supporting moss, rocks, or other "ground covers." For example, the implementation of a planter insert 300 shown in FIG. 3A includes a body 310 with a main portion 320 that has an outer surface 322 with a convex shape. And, the implementation of a planter insert 300' shown in FIG. 3B has a body 310' with a main portion 320' that has a concave shape.

The main portion 220 shown in FIG. 2 has a circular perimetrical shape such that the main portion 220 is configured to fit within a planter 110 having an inner surface 116 that has a circular cross-sectional shape. In other implementations, the main portion can have any closed perimetrical shape, such as ovate, triangular, quadrilateral, square, pentagonal, or hexagonal. For example, in the implementation shown in FIG. 4, the planter insert 400 has a main portion 420 with a rectangular perimetrical shape such that the main portion 420 is configured to fit within a planter having a rectangular cross-sectional shape.

The main portion 220 shown in FIG. 2 defines four cavities 230 that are each sized to receive a nursery pot containing a potted plant. Each of the four cavities 230 includes a wall 232 and a floor 234. The floor 234 is spaced apart from the outer surface 222 and the inner surface 224 of the main portion 220 such that the floor 234 is closer to the inner surface 224 than the outer surface 222. The wall 232 of each of the cavities 230 extends between the inner surface 224 of the main portion 220 and the floor 234 of the cavity 230.

The wall 232 and floor 234 of each of the cavities 230 form a sealed compartment for the cavity 230 that is impermeable to liquid. Thus, when a plant 102 in a nursery pot is disposed within the cavity 230 and receives water, the runoff water that is not absorbed by the soil of the plant 102 does not drain into the planter 110. Instead, the runoff water remains in the cavity 230 of the planter insert 200. The nursery pot containing the plant 102 can be removed from the planter insert 200 and set aside, and the planter insert 200 can be removed from the planter 110 so that the excess water remaining in the cavity 230 of the planter insert 200 can be poured away. The planter insert 200 can then be replaced within the planter 110, and the nursery pots containing the plants 102 can be replaced within their respective cavities 230. Thus, the water impermeable structure of the planter inserts 200 disclosed herein prevents the user from needing to lift or tip the planter 110 to remove excess water from the planter 110. In addition, when the user sees water within the cavities, the user receives feedback that the amount of water added to the plant may be too much and can make adjustments to how much water is applied or when water is applied in the future.

The main portion 220 and the four cavities 230 of the planter insert 200 shown in FIG. 2 are formed as a single piece, which prevents water from flowing through the base 210 of the planter insert 200 into the planter 110. However, in other implementations, the main portion and the cavities can be separate pieces.

Figure 3A:
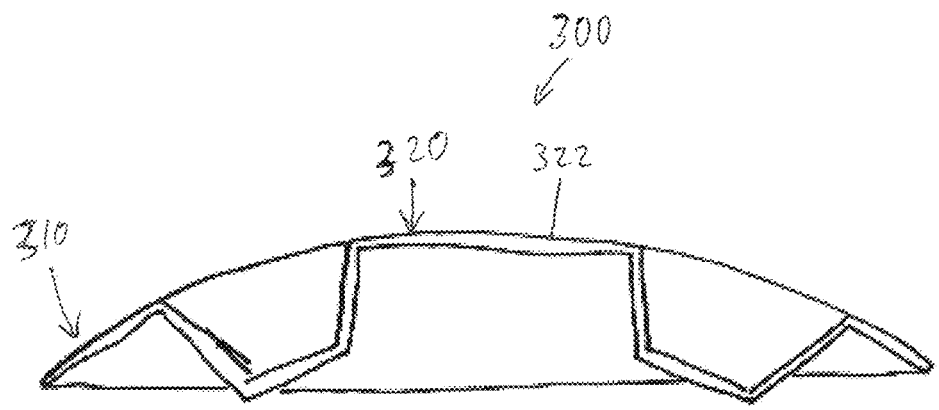
FIG. 3A is a cross-sectional view of a planter insert having a convex main portion, according to another implementation.
Figure 3B:
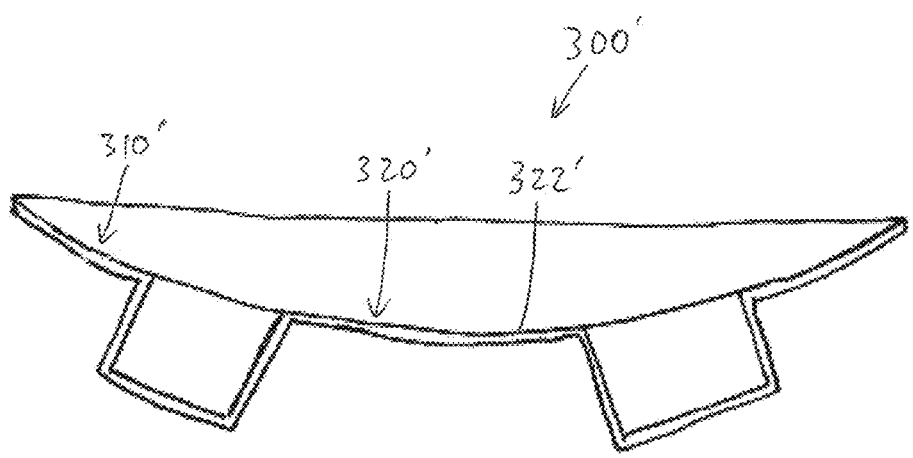
FIG. 3B is a cross-sectional view of a planter insert having a concave main portion, according to another implementation.

The walls 232 of the cavities 230 shown in FIGS. 2 and 3A are tapered such that a cross-sectional area of the cavity 230 closer to the outer surface 222 of the main portion 220 is larger than a cross-sectional area of the cavity 230 closer to the floor 234 of the cavity 230. However, in other implementations, the cavity may include straight walls or walls that taper outwardly toward the floor of the cavity. For example, in the implementations shown in FIGS. 3B and 4, the cavity 430 of the planter inserts 400 can include straight walls 432 such that the cross-sectional area of the cavity 430 is consistent from the outer surface 422 of the main portion 420 to the floor 434 of the cavity 430.

Although the base 210 shown in FIG. 2 includes four cavities 230, in other implementations, the base includes any number of one or more cavities. For example, the planter insert 400 shown in FIG. 4 includes three cavities 430. The cavities can be arranged in any orientation or pattern to allow for any desired arrangement of plants placed in the planter insert.

Figure 4:
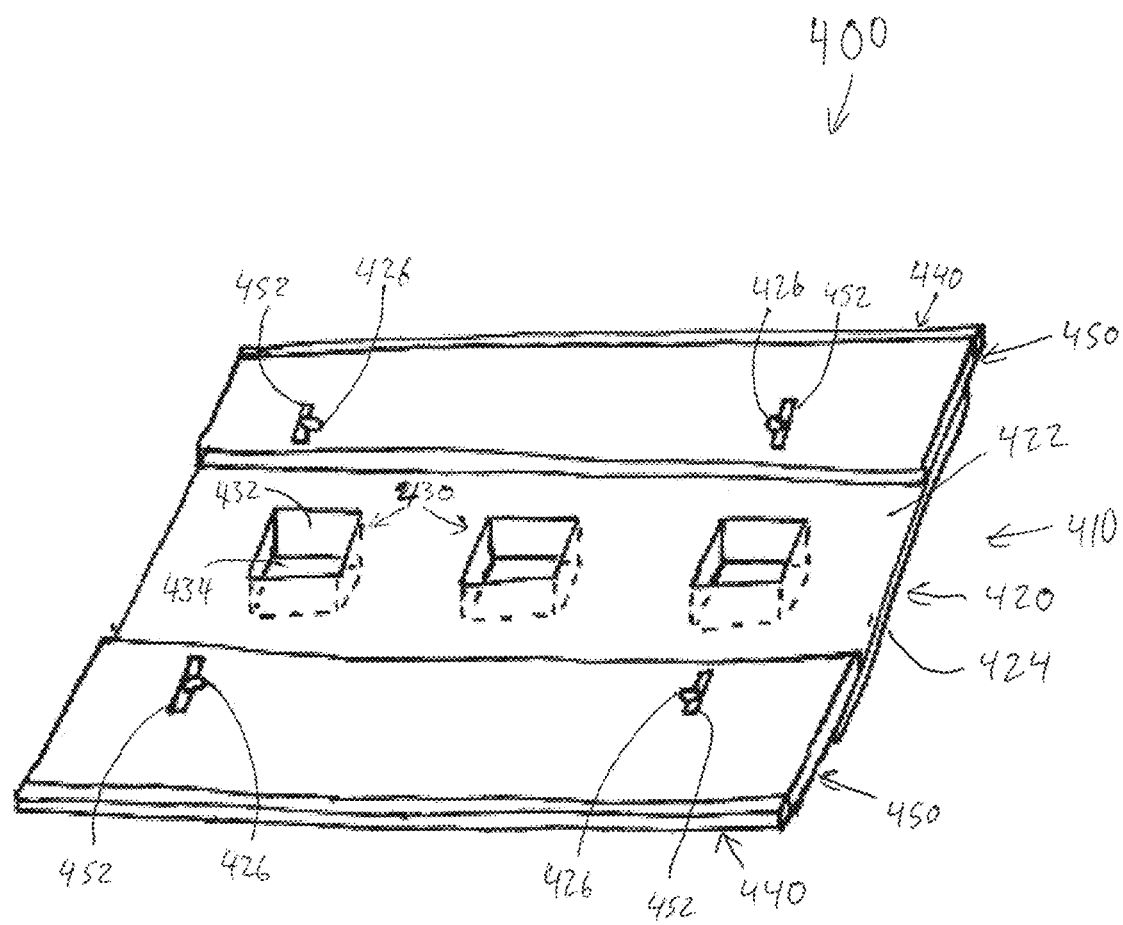
FIG. 4 is a perspective view of a planter insert, according to another implementation.

The wall 232 of each of the four cavities 230 shown in FIG. 2 has a circular cross-sectional shape as viewed in a plane parallel to the floor 234 of the cavities 230. In other implementations, the cavities can have any closed shape cross-section as viewed in a plane parallel to the floor of the cavities, such as ovate, triangular, quadrilateral, pentagonal, or hexagonal. For example, the wall 432 of each of the three cavities 430 of the planter insert 400 shown in FIG. 4 has a rectangular cross-sectional shape as viewed in a plane parallel to the floor 434 of the cavities 430. Furthermore, in other implementations, the cross-sectional area of each cavity can be the same as the others or one or more of the cavities can have a different cross-sectional area. For example, the cross-sectional area of each cavity 430 within the base 410 shown in FIG. 4 is the same, and one or more of the cavities 230 in FIG. 2 have a different cross-sectional area than one or more of the other cavities 230 of the same base 210.

The flange 240 of the planter insert 200 shown in FIG. 2 is coupled directly to the perimetrical edge of the main portion 220 of the base 210. For example, the flange 240 may be integrally formed with the main portion 220 or formed separately and directly coupled thereto. The circular shape of the flange 240 is configured to be removably engageable with the inner surface 116 of the wall 114 of a circular planter 110 such that the floor 234 of each of the cavities 230 is spaced apart from the floor 112 of the planter 110, as shown in FIG. 1.

The radially outermost edge of the flange 240 includes a flexible rolled edge 242. As the planter insert 200 is disposed within the tapered planter 110, the rolled edge 242 of the flange 240 engages the inner surface 116 of the wall 114 of the planter 110. The rolled edge 242 is flexible and resilient such that, as the weight of the planter insert 200 exerts a force from the flange 240 to the planter wall 114, the rolled edge 242 resiliently unrolls to apply additional radially outward force on the inner surface 116 of the wall 114 of the planter 110 such that the friction from the flange 240 resists the planter insert 200 from moving further toward the floor 112 of the planter 110. Although the flexible rolled edge 242 of the flange 240 shown in FIG. 2 is rolled in a direction toward the inner surface 224 of the main portion 220, in other implementations, the flexible rolled edge of the flange is rolled in a direction toward the outer surface of the main portion, and the weight of the planter insert exerts a force from the flange to the planter wall to cause the rolled edge to resiliently further unroll to apply additional radially outward force on the inner surface of the wall of the planter. In other implementations, the flange does not include a rolled edge. In some implementations, the flange includes any other frictional edge feature, such as a frictional material, engaging teeth, gears, or any combination of friction engaging features. And, in other implementations, the flange includes hooks or other features configured for engaging the edge of the planter wall.

Although the flange 240 shown in FIGS. 1 and 2 engages the inner surface 116 of the wall 114 of the planter 110, in other implementations, the flange of the planter insert can rest on, or extend over and wrap around, the top edge of the planter.

The flange 240 shown in FIG. 2 has a predetermined, fixed diameter of 18 inches such that the planter insert 200 is configured to fit inside of a tapered planter 110 with a 20-inch maximum inner diameter. However, the flange 240 includes cut template lines 244 for reducing the diameter of the flange 240 for use with different sized planters. For example, the flange 240 of the planter insert 200 shown in FIG. 2 includes cut template lines 244 having diameters of 16 inches, 14 inches, and 12 inches. A user can use any cutting device to trim the material of the flange 240 that is radially outward of the desired cut template line 244 to reduce the size of the flange 240 to the desired diameter. In some implementations, the flange can have cut template lines at any size diameter, such as 18 inches, 16 inches, 14 inches, 12 inches, 10 inches, 8 inches, 6 inches, or 4 inches. In other implementations, the flange has a perimetrical shape other than circular. In such implementations, the flange can include cut template lines for reducing any of the dimensions of the flange such that the flange can be used in any size or shaped planter.

The planter insert 400 shown in FIG. 4 includes an adjustable collar 450 to which the flange 440 is coupled such that the flange 440 is indirectly coupled to the base 410. The collar 450 includes two portions that are each slidably coupled to the main portion 420 of the base 410 and are selectively and separately adjustable in an inward direction and an outward direction relative to the perimetrical edge of the main portion 420 to allow a user to adjust the dimensions of the planter insert 400. The main portion 420 of the base 410 includes clips 426 that extend from the outer surface 422, and the portions of the collar 450 each define slots 452. Each of the clips 426 of the main portion 420 extend through one of the slots 452 of the collar 450 such that the clips 426 frictionally couple the portions of the collar 450 to the main portion 420. A user can apply a force to the collar 450 in an outward direction to overcome the frictional coupling of the main portion 420 and the collar 450 to move a portion of the collar 450, and thus the flange 440, in the outward direction from a perimetrical edge of the main portion 420. Although the collar 450 in FIG. 4 is coupled to the main portion 420 by clips 426 and slots 452, in other implementations, the collar can be coupled to the main portion by magnets, hook and loop fasteners, brackets, fasteners, or one or more of any other devices that allow a user to move the collar outwardly or inwardly relative to the base but cause the collar to maintain its position when disposed within a planter. The portions of the collar 450 shown in FIG. 4 are coupled to the main portion 420 of the base 410, but in other implementations, the collar can be coupled to any other portion of the base.

The flange 240 of the planter insert 200 shown in FIGS. 1 and 2 is circular shaped such that the flange 240 corresponds to the circular shape of the wall 114 of the planter 110 in which it is disposed. For planters having other shapes, a planter insert having a flange with a corresponding shape can be selected to be used with the planter. For example, for a planter having a rectangular shaped wall, a planter insert 400 having a rectangular shape (such as the planter insert 400 shown in FIG. 4) can be used.

The entire flange 240 of the planter insert 200 shown in FIGS. 1 and 2 is removably engaged with a portion of the inner surface 116 of the wall 114 of the planter 110 such that the floor 234 of each of the cavities 230 is spaced apart from the floor 112 of the planter 110. However, in other implementations, only a portion of the flange is removably engageable with a portion of the inner surface of the wall of the planter.

The main portion 220 of the planter insert 200 shown in FIGS. 1 and 2 also includes two handles 260 coupled to the main portion 220 of the base 210. The handles 260 are cupped shaped and extend from the main portion 220. The user can insert his/her hand into the handle 260 to aid in lifting the planter insert 200 out of a planter 110. Although the handles 260 shown in FIGS. 1 and 2 are coupled to the main portion 220 of the base 210, in other implementations, the handles are coupled to, or formed from, any other portion of the planter insert. In other implementations, the planter insert includes any number of one or more handles. In some implementations, the handles are openings defined by a portion of the planter insert or are any other structure that allow a user to grip the handle.

The base 210 and flange 240 shown in FIG. 2 includes acrylonitrile butadiene styrene (ABS). However, in other implementations, the base and/or flange can include any other polymer such as acrylonitrile styrene acrylate (ASA), polycarbonate (PC), poly(methyl methacrylate) (PMMA), polypropylene (PP), high density polyethylene (HDPE), polyoxymethylene (POM), nylon, or glass filled nylon (Nylon+GF). In some implementations, the base and/or flange can include fiberglass, aluminum, steel, or any other material that is impermeable to liquid. The base 210 and flange 240 shown in FIG. 2 is transparent, but in other implementations, the base and flange can be translucent or opaque and can be any color or design of colors.

FIGS. 5-12 show a planter insert 500 according to another implementation. The planter insert 500 shown in FIGS. 5-12 includes a base 510, four legs 520, and a cover 540.

The base 510 includes a wall 512 and a floor 514. The wall 512 and the floor 514 define a cavity 530. The wall 512 includes a first end 512a and a second end 512b opposite and spaced apart from the first end 512a. The floor 514 is coupled to the second end 512b of the wall 512. The floor 514 includes a protrusion 516 extending toward the first end 512a of the wall 512.

The wall 512 and floor 516 of the base 510 form a sealed compartment for the cavity 530 that is impermeable to liquid. Thus, when a plant in a nursery pot is disposed within the cavity 530 and receives water, the runoff water that is not absorbed by the soil of the plant does not drain into the planter. Instead, the runoff water remains in the cavity 530 of the planter insert 500, such as in the spaces set below the protrusion 516. The nursery pot containing the plant can be removed from the planter insert 500 and set aside, and the planter insert 500 can be removed from the planter so that the excess water remaining in the cavity 530 of the planter insert 500 can be poured away. The planter insert 500 can then be replaced within the planter, and the nursery pots containing the plant can be replaced within their respective cavities 530. Thus, the water impermeable structure of the planter inserts 500 disclosed herein prevents the user from needing to lift or tip the planter to remove excess water from the planter. In addition, when the user sees water within the cavity 530, the user receives feedback that the amount of water added to the plant may be too much and can make adjustments to how much water is applied or when water is applied in the future.

The base 510 shown in FIGS. 5-12 has a circular perimetrical shape such that the base 510 is configured to fit within a planter having an inner surface that has a circular cross-sectional shape. In some implementations, the base can have any closed perimetrical shape, such as ovate, triangular, quadrilateral, square, pentagonal, or hexagonal.

Figure 5:
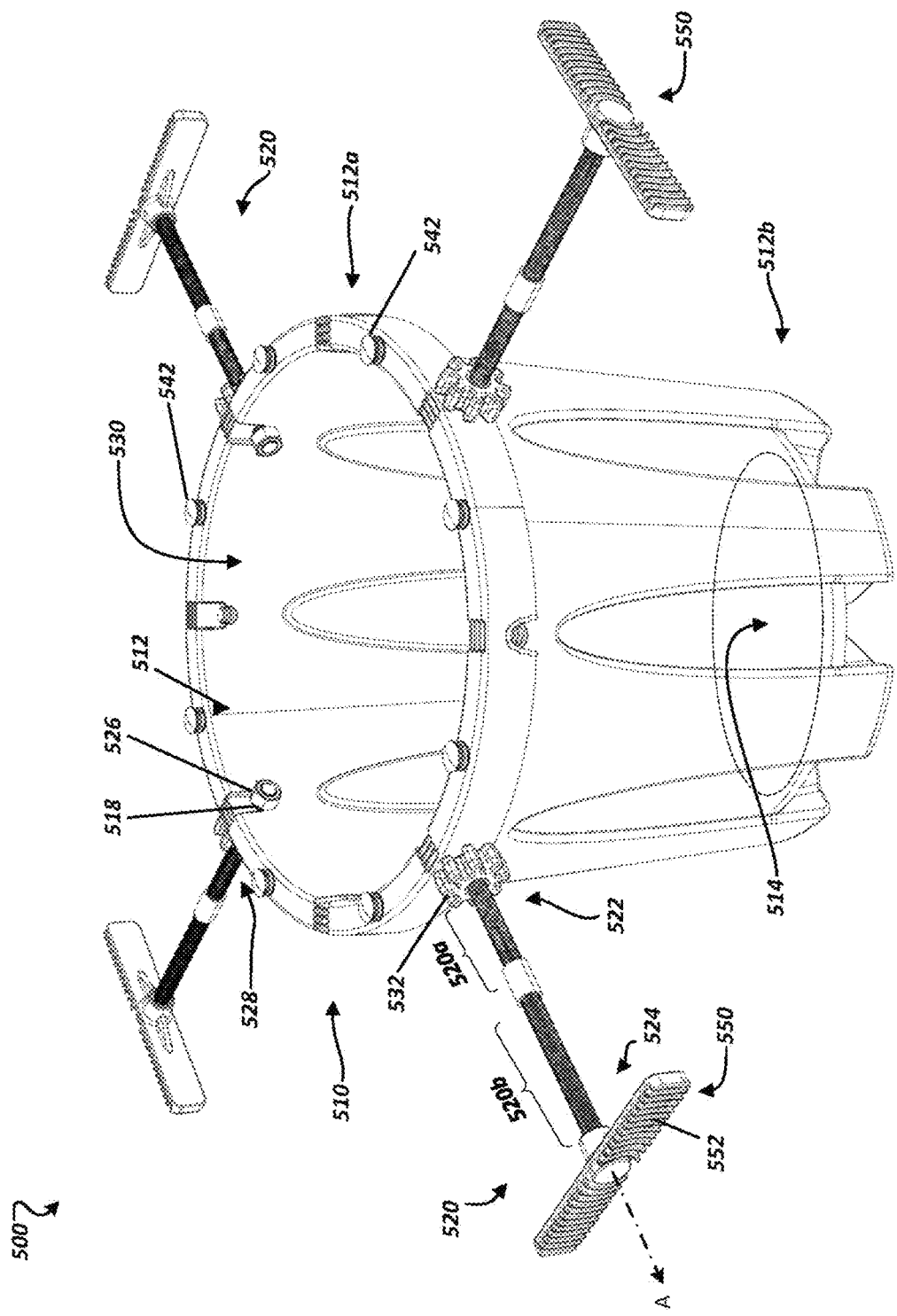
FIG. 5 is a top perspective view of a planter insert, according to another implementation.

The wall 512 of the base 510 shown in FIG. 5 has a circular cross-sectional shape as viewed in a plane parallel to the floor 514. In some implementations, the base can have any closed shape cross-section as viewed in a plane parallel to the floor of the base, such as ovate, triangular, quadrilateral, pentagonal, or hexagonal.

The walls 512 of the base 510 shown in FIG. 5 are tapered such that a cross-sectional area of the first end 512a of the wall 512 is larger than a cross-sectional area of the second end 512b of the wall 512. However, in some implementations, the base may include straight walls or walls that taper outwardly toward the floor of the base such that the cross-sectional area of the second end of the wall is larger than the cross-sectional area of the first end of the wall.

Although the planter insert 500 shown in FIG. 5 includes one cavity 530, in other implementations, the planter insert 500 includes any number of one or more cavities. For example, FIG. 13 shows an implementation of a planter insert 500' similar to the planter insert 500 shown in FIGS. 5-12, but the planter insert 500' shown in FIG. 13 includes a cover 540' having more than one cavity. Planter insert 500' includes five cavities, including a central cavity 530 and four secondary cavities 530'. The secondary cavities 530' are defined by a portion of the cover 540' such that they form a single piece. Thus, when the planter insert is disposed within a planter, the secondary cavities 530' are held above the bottom of the planter, providing a secondary location for a nursery plant. In some implementations, the bodies defining the secondary cavities are removably couplable to the cover.

In some implementations, the bodies defining the secondary cavities are separately formed from the cover and are permanently coupled to the cover, such as by sewing, welding, fusing, fasteners, adhesive, or any other coupling means known in the art.

The base 510 shown in FIGS. 5-12 includes acrylonitrile butadiene styrene (ABS). However, in other implementations, the base can include any other polymer such as acrylonitrile styrene acrylate (ASA), polycarbonate (PC), poly(methyl methacrylate) (PMMA), polypropylene (PP), high density poly ethylene (HDPE), polyoxymethylene (POM), nylon, or glass filled nylon (Nylon+GF). In some implementations, the base can include fiberglass, aluminum, steel, or any other material that is impermeable to liquid. The base 510 shown in FIGS. 5-12 is transparent, but in other implementations, the base can be translucent or opaque and can be any color or design of colors.

Figure 11:
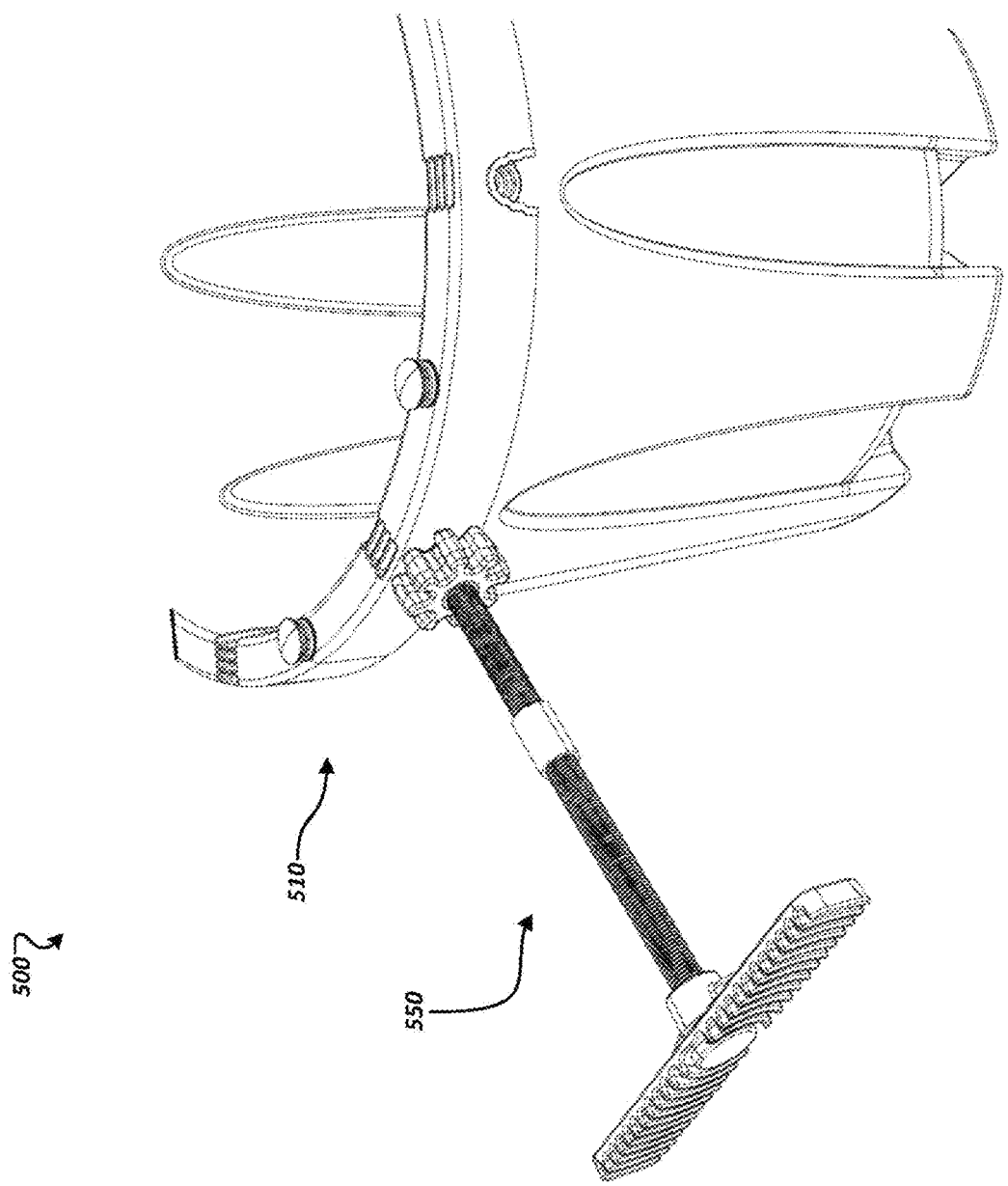
FIG. 11 is a detail perspective view of the leg of the planter insert of FIG. 5.
Figure 12:
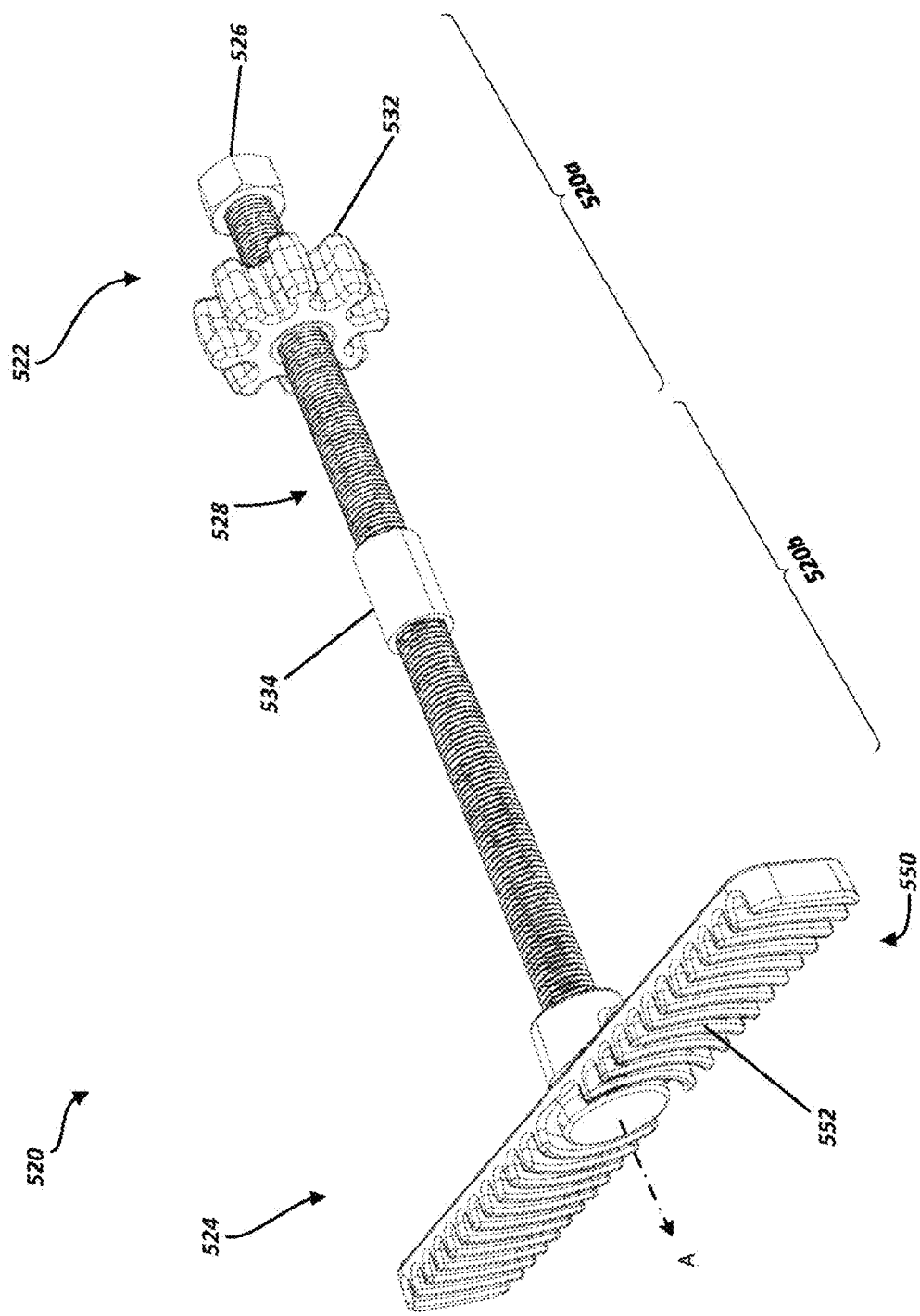
FIG. 12 is a detail perspective view of the leg of FIG. 11 without the planter insert.
Figure 13:
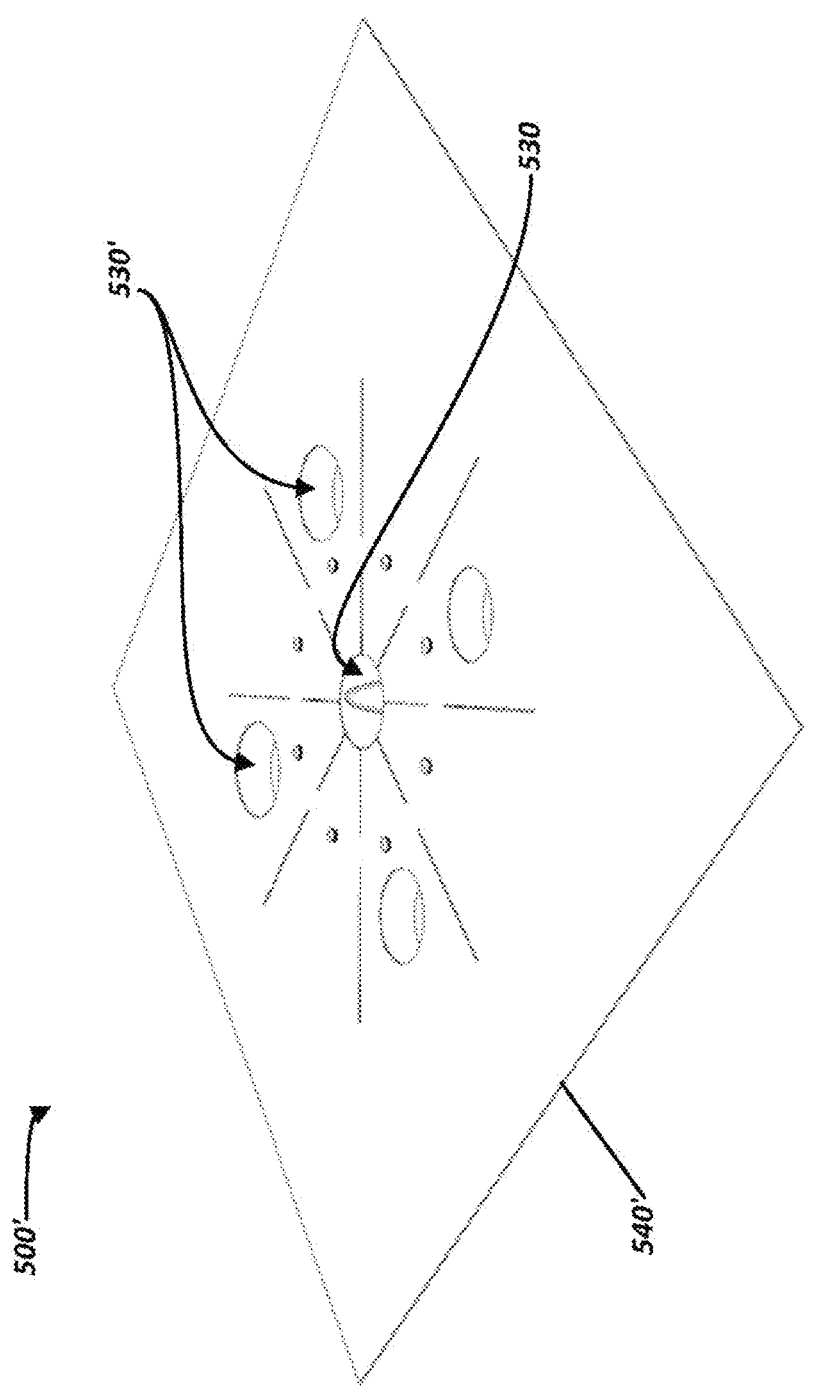
FIG. 13 is a top perspective view of a planter insert with a cover with multiple cavities, according to another implementation.

FIGS. 11 and 12 provide further details on the legs 520 of FIGS. 5-12. The legs 520 each have a first end 522 and a second end 524 opposite and spaced apart from the first end 522. The first end 522 of each of the legs 520 is removably coupled to the base 510.

The first end 522 of each leg 520 is disposed in an opening 518 in the base 510. The first end 522 of each leg 520 is removably coupled to a nut 526 such that the leg 520 is retained within the opening 518. The legs 520 are threaded rods defining threads 528 along an outer surface. Each leg 520 is configured to engage with the threads of a nut 526. When engaged, the nut 526 can abut an inner surface of the wall 512 of the base 510.

The legs 520 further include a knob 532. The knob 532 includes threads which engage with the threads 528 of the threaded rod. When engaged, the knob 532 can abut an outer surface of the wall 512 of the base 510.

The legs 520 include a first leg portion 520a having the first end 522, a second leg portion 520b having the second end 524, and a coupler 534. The first leg portion 520a is threadingly couplable to the coupler 534, and the coupler 534 is threadingly couplable to the second leg portion 520b such that the first leg portion 520a is axially aligned with the second leg portion 520b, as shown in FIGS. 5 and 12.

Although the legs 520 shown in FIGS. 5-12 are removably coupled to the base 510, in some implementations, the legs 520 are fixedly attached to the base 510. Although the legs 520 shown in FIGS. 5-12 are threaded rods, in some implementations, only a portion of the leg is threaded (e.g., only a portion closest to the first end of the leg). Although FIGS. 5-12 show a planter insert 500 with four legs 520, in some implementations, the planter insert includes two, three, or five or more legs. Although FIGS. 5-12 show each leg 520 having a threads 528, a nut 526, and a knob 532, in some implementations, less than all of the legs include threads, a nut, and/or a knob. In some implementations, some legs include a nut but do not include a knob. In some implementations, the first leg portion includes threads only on the first end of the leg. In some implementations, the second leg portion includes threads only on the end closer to the first end of the leg. In some implementations, the first and second leg portions form a single, continuous leg such that the coupler is not present.

As shown in FIGS. 5-12, each of the legs 520 include feet 550. The feet 550 are disposed on the second end 524 of each of the legs 520. The feet 550 are coupled to the second leg portion 520b.

The feet 550 are flexible and include a textured surface 552. However, in some implementations, the feet are rigid. Although the feet 550 shown in FIGS. 5-12 are fixedly coupled to the second end 524 of the legs 520, in some implementations, the feet are removably coupled to the second leg portion.

Figure 6A:
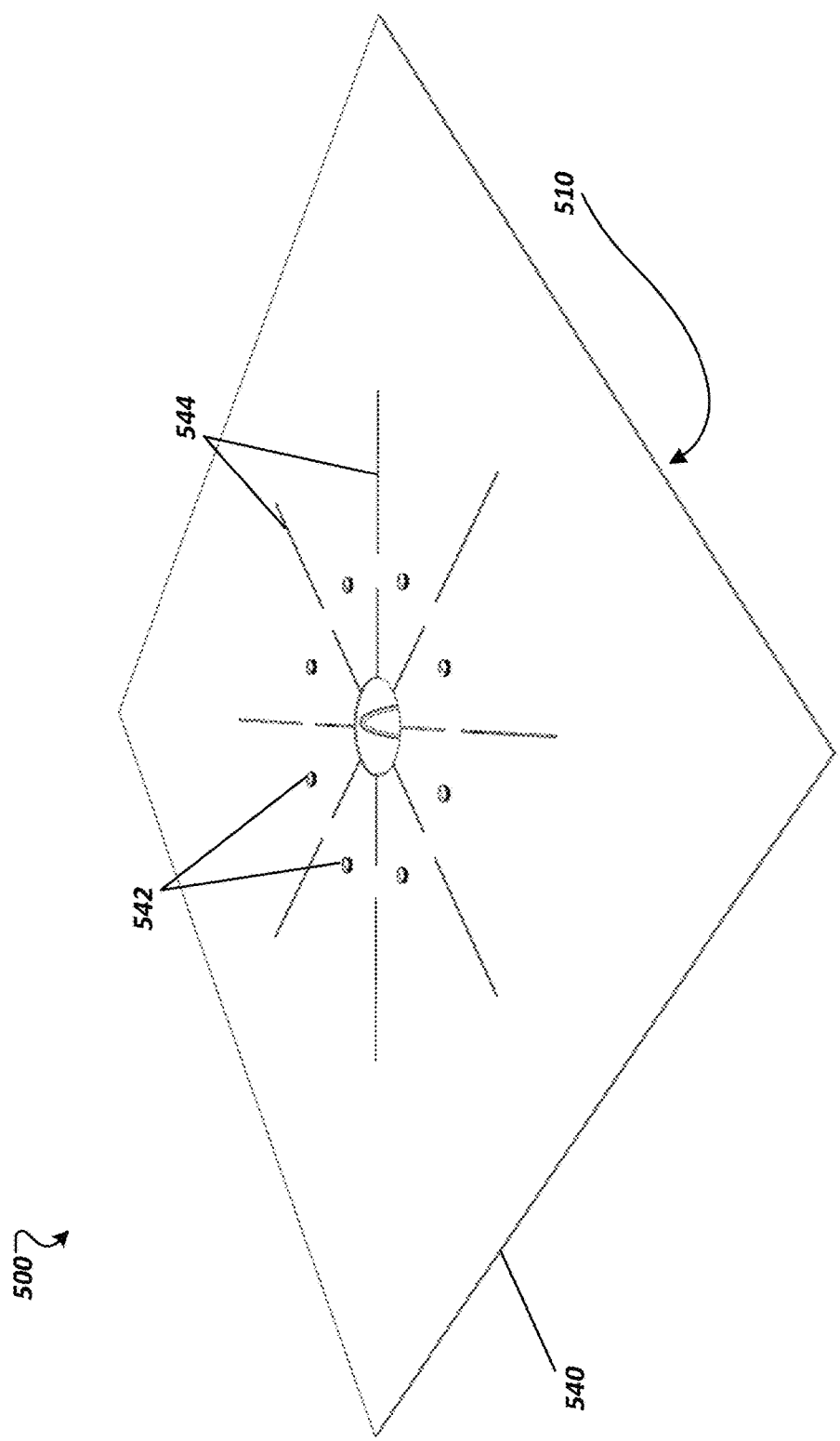
FIG. 6A is a top perspective view of the planter insert of FIG. 5 with a cover.
Figure 6B:
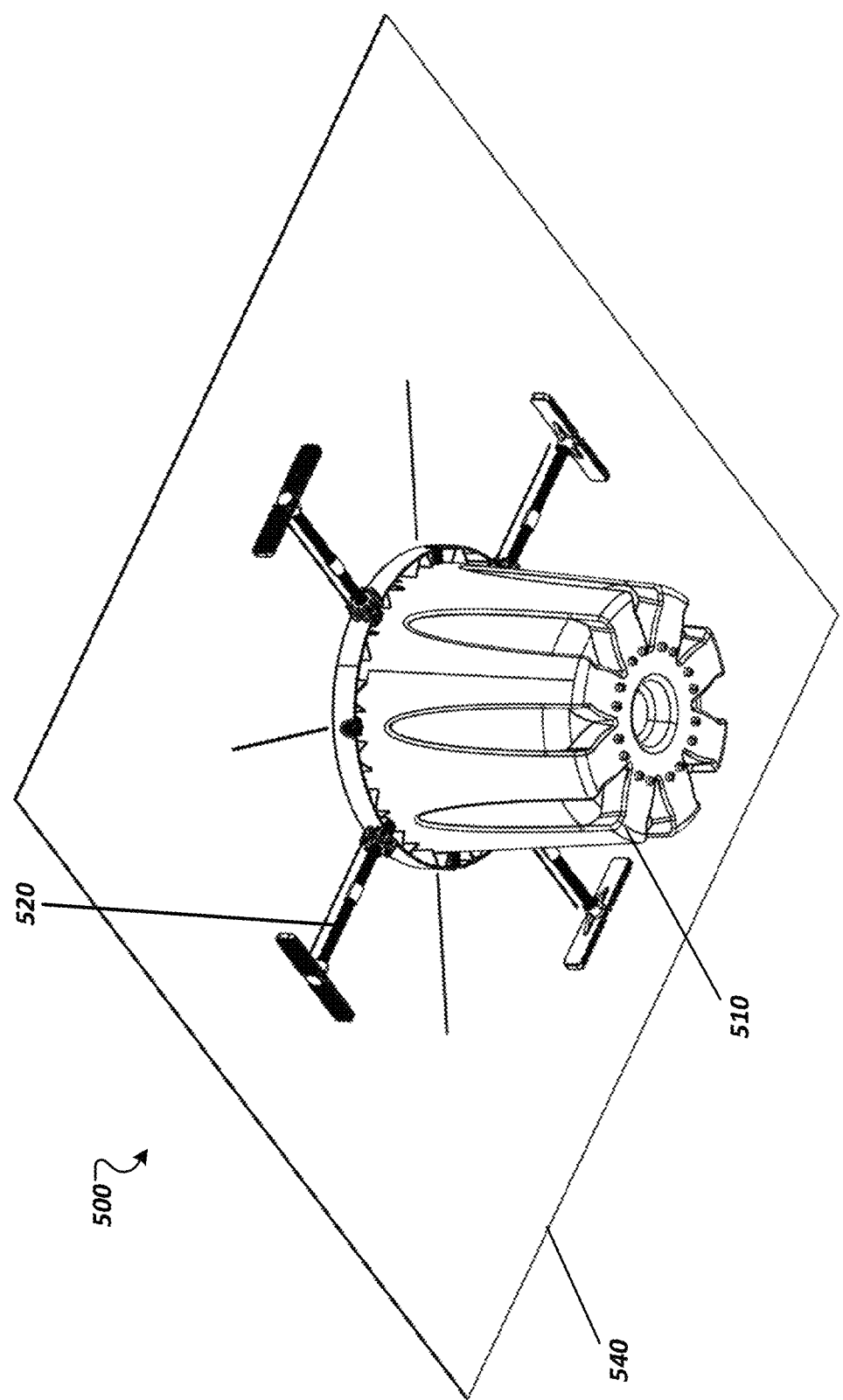
FIG. 6B is a bottom perspective view of the planter insert of FIG. 5 with a cover.
Figure 6C:
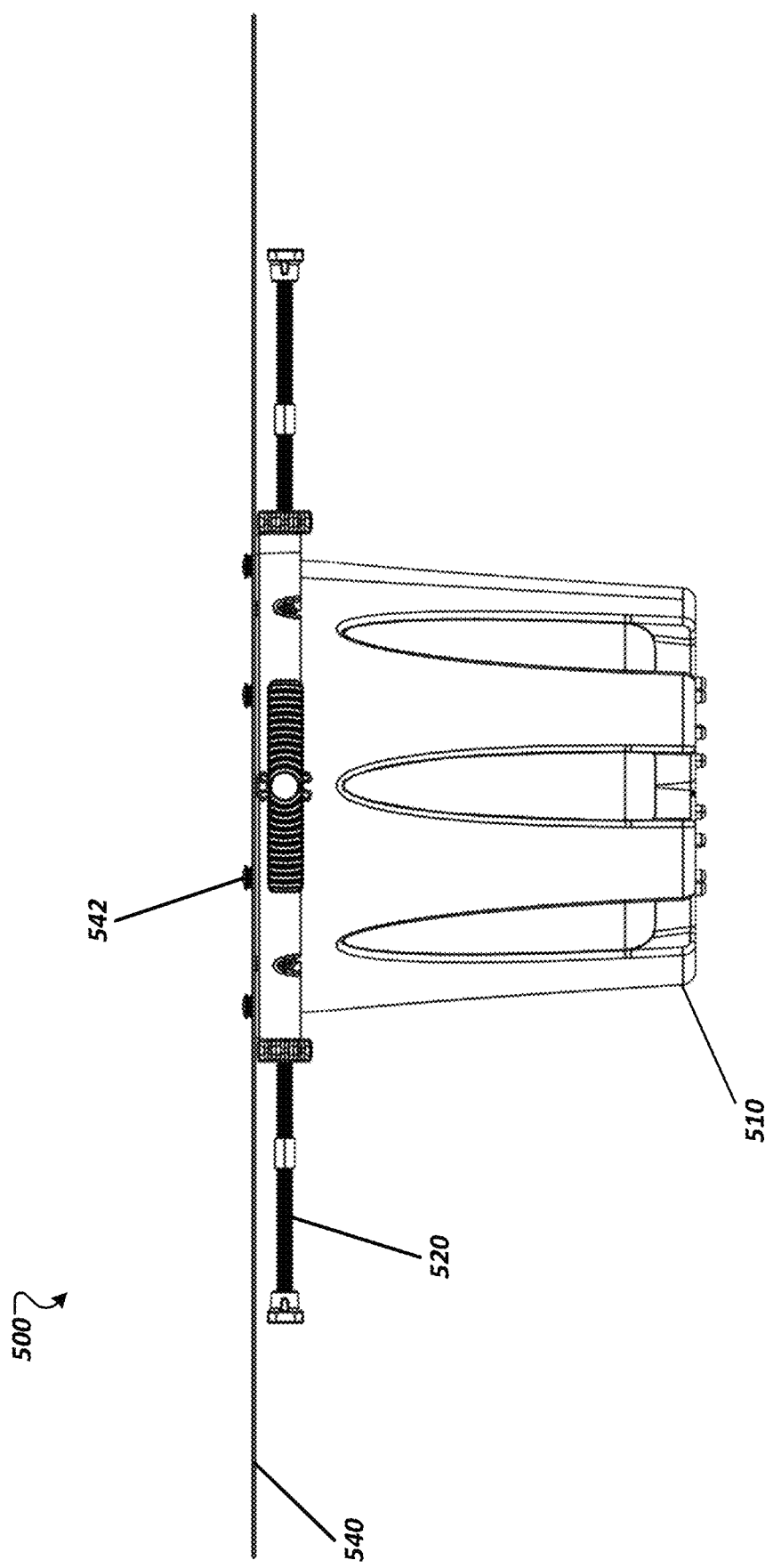
FIG. 6C is a side view of the planter insert of FIG. 5 with a cover.
Figure 7:
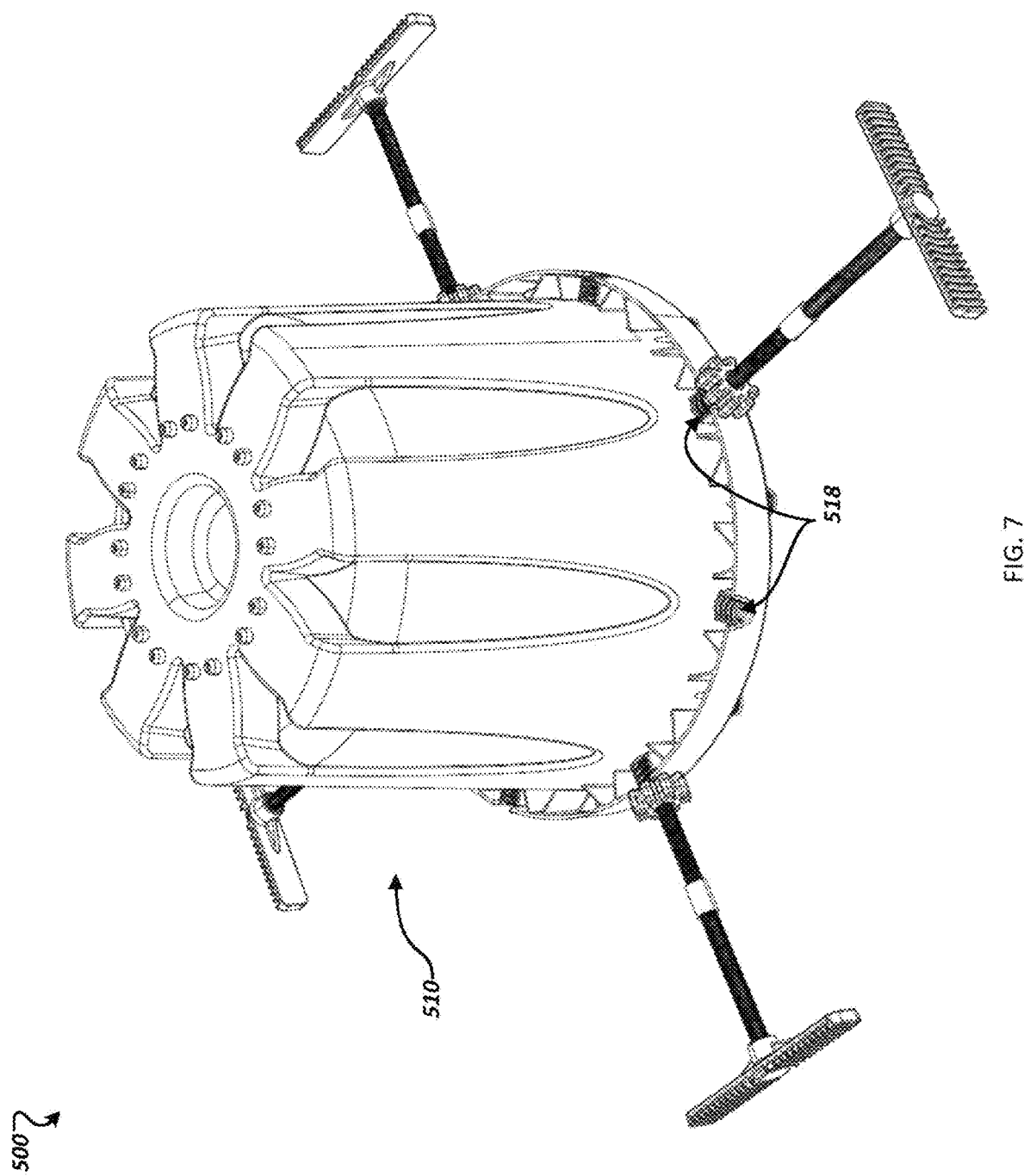
FIG. 7 is a bottom perspective view of the planter insert of FIG. 5.
Figure 8:
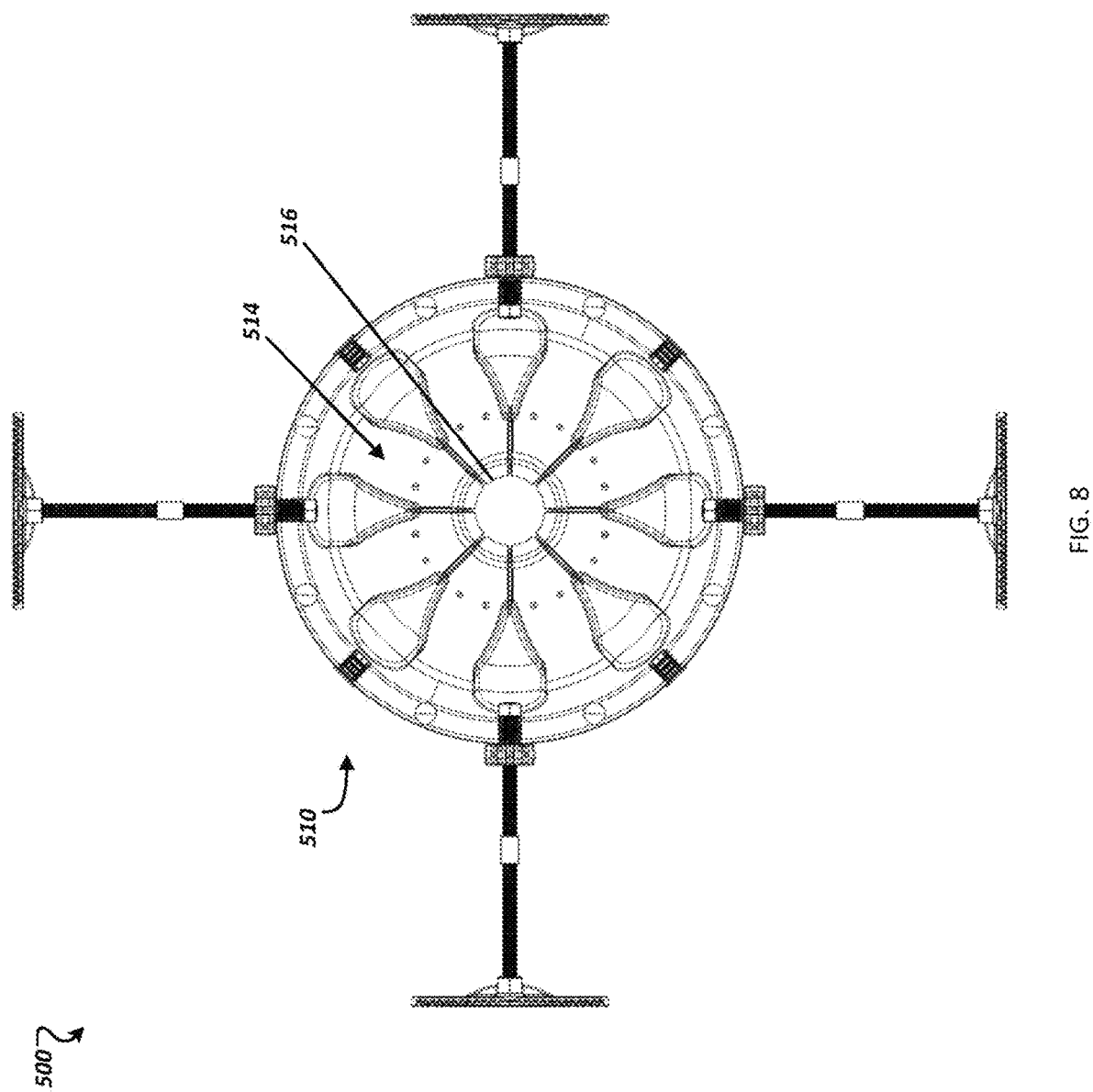
FIG. 8 is a top view of the planter insert of FIG. 5.
Figure 9:
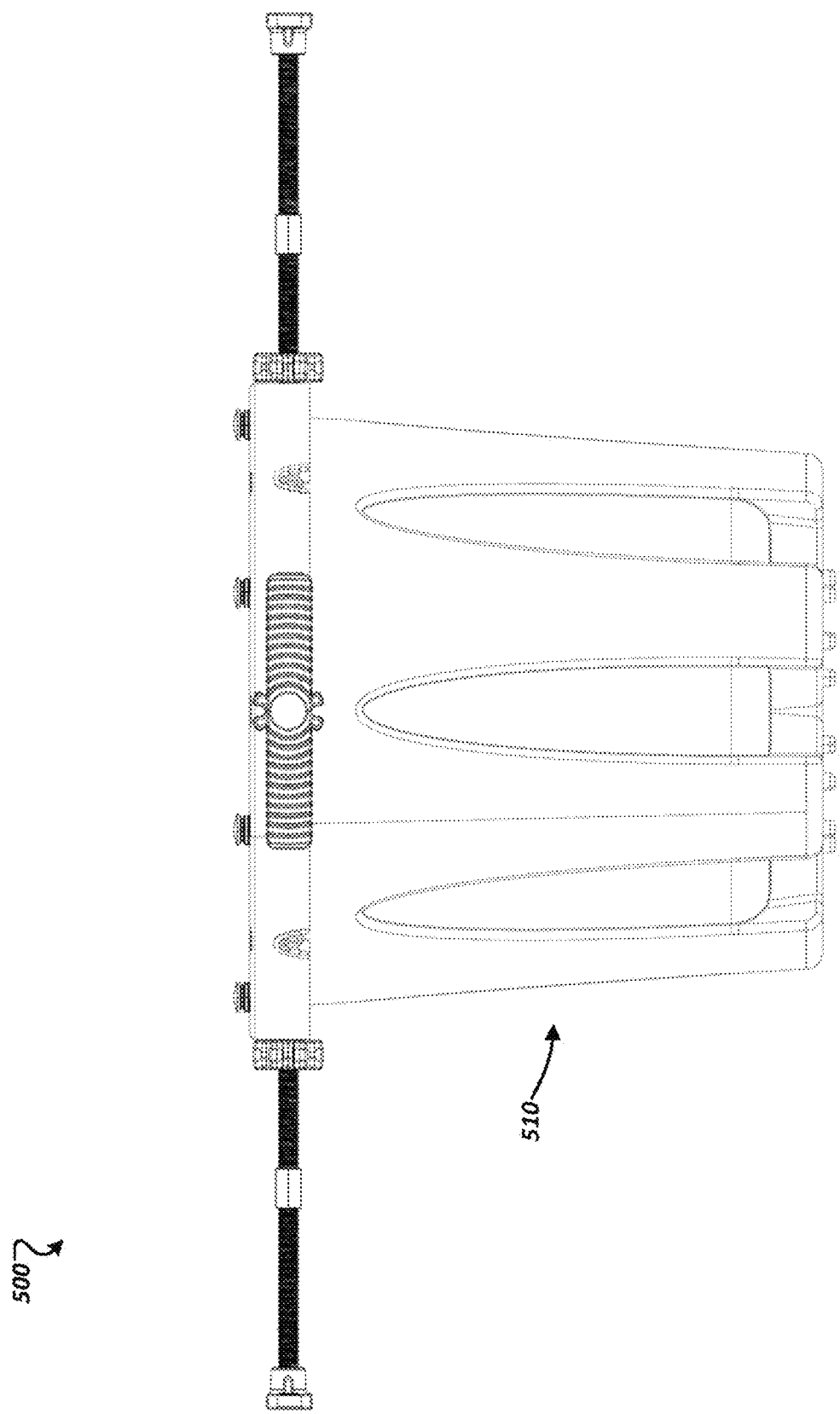
FIG. 9 is a side view of the planter insert of FIG. 5.
Figure 10:
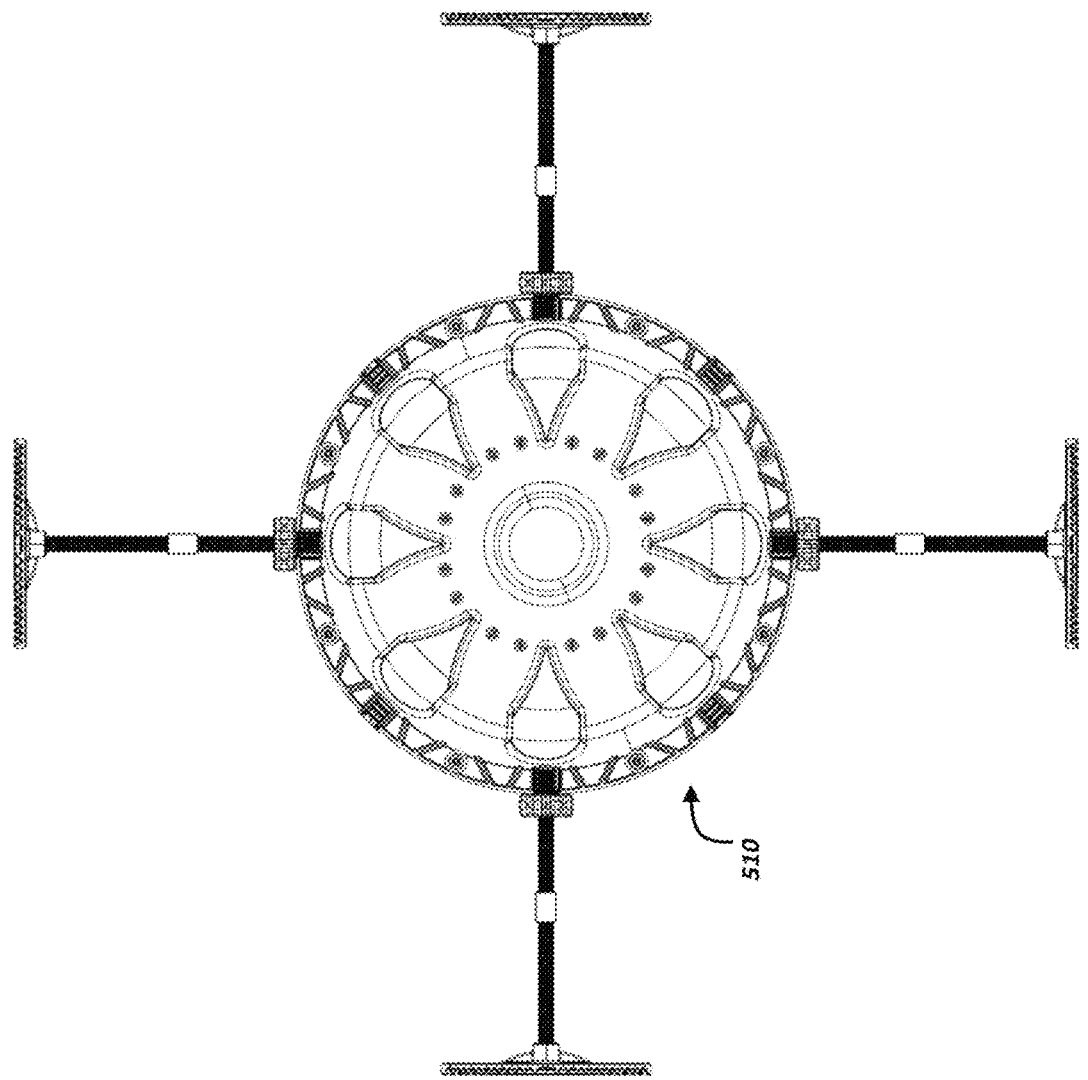
FIG. 10 is a bottom view of the planter insert of FIG. 5.

The planter insert 500 shown in FIG. 5 is shown without the cover 540, but FIGS. 6A-6C show the planter insert 500 with the cover 540. The cover 540 in FIGS. 6A-6C includes a flexible material including a stretch knit fabric. However, in other implementations, a variety of other flexible materials may be used for the cover 540. In other implementations, the cover 540 could be rigid and may include one or more rigid materials.

The first end 512a of the wall 512 of the base 510 includes buttons 542 disposed along the perimetrical edge of the first end 512a of the wall 512 of the base 510. The cover 540 includes button openings that are alignable with the buttons 542. The buttons 542 can be disposed within the button openings of the cover 540 to couple the cover 540 to the base 510.

When the cover 540 is coupled to the base 510, the cover 540 extends from the base 510 to the second ends 524 of the legs 520. The cover 540 extends over each of the legs 520 and feet 550 such that the cover 540 is pulled tight along each leg 520. The cover 540 is disposed between the foot 550 and the inner surface of a planter to hold the cover 540 firmly against the inner surface of the planter to prevent the cover 540 from sagging.

The cover 540 defines knob openings 544 that are each configured to be aligned with a different one of the knobs 532. The knob openings allow a user access to the knobs through the cover. In some implementations, the cover may include more or less knob openings than the number of knobs on the legs.

When assembling the planter insert 500, a user couples the first leg portion 520a to the coupler 534 and the coupler 534 to the second leg portion 520b to form the full leg 520. A user may choose among several sizes of first leg portions 520a and second leg portions 520b to create a leg 520 sizable for a specific planter. In addition to matching the rough geometry of the planter, the sizes of the leg portions 520a, 520b should be selected such that the first end 522 of the leg 520 does not extend too far through the opening 518 in the base 510 and into the cavity 530 such that a user is hindered from placing a plant in the cavity 530 of the planter insert 500. If the feet 550 are removably couplable to the legs 520, the user will couple the feet 550 to the second leg portion 520b. The user then will couple the knob 532 to the first leg portion 520a. Then, each leg 520 can be placed within each opening 518, and the nut 526 can be threadingly engaged to the first end 522 of the leg 520 to prevent the leg 520 from falling out of the opening 518 during assembly. A user may adjust the leg portions 520a, 520b to fit the planter more securely.

When inserting the planter insert 500 within a planter, a user can align each leg 520 and foot 550 with an inner surface of the planter. For a square or rectangular planter, the user may dispose the feet 550 in each of the inner corners of the planter. Then, the user can place the cover 540 over the base 510, coupling it to each of the buttons 542 via the button openings. The cover 540 is placed over each leg 520 such that it extends over each foot 550 and is disposed between the textured surface 552 of the foot 550 and the inner surface of the planter. The textured surface 552 allows for higher friction between the foot 550 and the cover 540. In particular, because the cover 540 is disposed between the inner surface of the planter and the foot 550, a strong force from the leg 520 to the planter, along with a textured surface 552, allows the base 510 to be securely suspended within the planter.

The knob 532 is configured to be turned relative to the leg 520 for moving the second end 522 of the leg 520 between a first position and a second position, wherein the second end 524 is closer to the base 510 in the first position than it is in the second position. Because the knob 532 abuts the outer surface of the base 510, twisting the knob 532 causes the leg 520 to which the knob 532 is threadingly engaged to move the second end 522 and the foot 550 from the first position to the second position. When moving from the first position to the second position, the second end 524 of leg 520 moves outwardly away from the base 510, as denoted in FIGS. 5 and 12 as direction A. Once the foot 550 is extended to the inner surface of the planter, a portion of the cover 540 is squeezed between the textured surface 552 and the inner surface of the planter.

A user can reach through each knob opening 544 of the cover 540 to turn a knob 532 to cause the second end 524 of leg 520 to move from the first position to the second position. Because the feet 550 of each leg 520 are firmly abutting the inner surface of the planter with portions of the cover 540 disposed between the feet 550 and the inner surface of the planter, the base 510 is suspended with in the planter above the bottom of the planter with the cover 540 held taught.

Once the assembly is complete, a nursery plant is disposed within the cavity 530 of the base 510. A user may dispose ground cover or other material on the cover 540 to create the illusion that the planter is fully filled. If secondary cavities are included with the cover, as in FIG. 13, then secondary nursery plants may be disposed therein.

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device are disclosed herein, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A planter insert comprising:
    a base having a wall and a floor, the wall and the floor defining a cavity, wherein the base is impermeable to liquid;
    two or more legs, including a first leg comprising: a first end having a threaded portion, and a second end opposite and spaced apart from the first end, wherein the first end of the first leg is coupled to the base via an opening defined in the base, wherein the second end of the first leg is movable between a first position and a second position, wherein the second end is closer to the base in the first position than it is in the second position;
    a foot coupled to the second end of the first leg, the foot having a textured surface configured to engage with an inner surface of a planter, the foot extending radially outward from the base;
    a threaded nut coupled to the threaded portion of the first leg and configured to abut the wall of the base; and
    a knob configured to engage with the threaded portion of the first leg, the knob configured to abut an outer surface of the wall of the base, wherein turning the knob moves the second end of the first leg between the first position and the second position.

2. The planter insert of claim 1, wherein the wall has a first end and a second end opposite and spaced apart from the first end of the wall, wherein the floor is coupled to the second end of the wall, wherein the floor includes a protrusion extending toward the first end of the wall.

3. The planter insert of claim 1, wherein the two or more legs are removably coupled to the base.

4. The planter insert of claim 1, wherein the second end of the first leg moves in an axial direction away from the base when moving from the first position to the second position.

5. The planter insert of claim 1, wherein each of the two or more legs comprise a first leg portion having the first end and a second leg portion having the second end, wherein the first leg portion is couplable to the second leg portion such that the first leg portion is axially aligned with the second leg portion.

6. The planter insert of claim 5, wherein the first leg portion is couplable to the second leg portion by a coupler.

7. The planter insert of claim 6, wherein the first leg portion includes a first threaded portion and the second leg portion includes a second threaded portion, wherein the coupler includes threads couplable to the first threaded portion of the first leg portion and the second threaded portion of the second leg portion.

8. The planter insert of claim 1, wherein the foot is flexible.

9. The planter insert of claim 1, wherein the wall has a first end and a second end opposite and spaced apart from the first end of the wall, wherein the floor is coupled to the second end of the wall.

10. The planter insert of claim 9, further comprising a cover removably coupled to the base.

11. The planter insert of claim 10, wherein the cover extends from the base to the second ends of each of the two or more legs.

12. The planter insert of claim 10, wherein the cover comprises a flexible material.

13. The planter insert of claim 10, wherein the cover defines one or more secondary cavities.

14. The planter insert of claim 10, wherein the base further comprises at least one button disposed along a perimetrical edge of the first end of the wall, the cover including at least one button opening alignable with the at least one button of the base.

15. The planter insert of claim 1, wherein the base comprises a polymer.

16. The planter insert of claim 1, wherein the wall of the base has a circular cross-sectional shape as viewed in a plane parallel to the floor.

17. The planter insert of claim 1, wherein the cavity is configured to receive a nursery pot.

18. The planter insert of claim 1, wherein the wall and the floor defining the cavity are a single piece.

19. The planter insert of claim 1, wherein the two or more legs further comprises a second leg comprising: a first end having a threaded portion, and a second end opposite and spaced apart from the first end of the second leg, wherein the first end of the second leg is coupled to the base via an opening defined in the base, wherein the second end of the second leg is movable between a first position and a second position, wherein the second end of the second leg is closer to the base in the first position than it is in the second position, wherein a second foot is coupled to the second end of the second leg, the foot having a textured surface configured to engage with the inner surface of the planter.

20. A planter system comprising:

a planter having a floor and a wall extending from the floor, wherein the wall of the planter has an inner surface; and the planter insert of claim 1, wherein the planter insert is removably engageable with a portion of the inner surface of the wall of the planter such that the floor of the base of the planter insert is spaced apart from the floor of the planter.

* * * * *